United States Patent
Kim

(10) Patent No.: US 10,932,303 B2
(45) Date of Patent: Feb. 23, 2021

(54) METHOD FOR TRANSCEIVING SIGNALING RELATED TO PDN CONNECTION IN WIRELESS COMMUNICATION SYSTEM, AND DEVICE THEREFOR

(71) Applicant: LG Electronics Inc., Seoul (KR)

(72) Inventor: Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/315,842

(22) PCT Filed: Jul. 7, 2017

(86) PCT No.: PCT/KR2017/007305
§ 371 (c)(1),
(2) Date: Jan. 7, 2019

(87) PCT Pub. No.: WO2018/009025
PCT Pub. Date: Jan. 11, 2018

(65) Prior Publication Data
US 2019/0246436 A1      Aug. 8, 2019

Related U.S. Application Data

(60) Provisional application No. 62/379,761, filed on Aug. 26, 2016, provisional application No. 62/359,685, filed on Jul. 7, 2016.

(51) Int. Cl.
*H04W 76/10* (2018.01)
*H04W 60/00* (2009.01)
*H04W 84/04* (2009.01)

(52) U.S. Cl.
CPC .......... *H04W 76/10* (2018.02); *H04W 60/00* (2013.01); *H04W 84/042* (2013.01)

(58) Field of Classification Search
CPC .. H04L 65/1016; H04W 60/00; H04W 76/10; H04W 84/042
See application file for complete search history.

(56) References Cited

U.S. PATENT DOCUMENTS 9,775,079 B2 *  9/2017  Cheng ................... H04W 8/082
10,129,921 B2 * 11/2018  Huang-Fu ............. H04W 88/16
(Continued)

FOREIGN PATENT DOCUMENTS

CN    10907633 A  * 12/2018  ............. H04W 88/16
CN   109076089 A  * 12/2018  ......... H04L 65/1016
(Continued)

OTHER PUBLICATIONS

3GPP, 3GPP Technical Specification 22.011, Service accessibility, Jun. 2016, Version 14.3.0, Release 14 (Year: 2016).*
(Continued)

*Primary Examiner* — Eric Nowlin
(74) *Attorney, Agent, or Firm* — Fish & Richardson P.C.

(57) ABSTRACT

An embodiment of the present invention provides a method for user equipment (UE) to transceive signals related to packet data network (PDN) connection in a wireless communication system, the method for transceiving signals related to PDN connection comprising: a step of checking 3GPP PS Data Off Exempt services; a step in which UE determines whether or not to create PDN connection, based on the type of PDN connection the UE wants to create and the result of checking the 3GPP PS Data Off Exempt services; and a step of transmitting a PDN connection request if the UE decides to create the PDN connection.

17 Claims, 6 Drawing Sheets

(56) References Cited

U.S. PATENT DOCUMENTS

| | | | |
|---|---|---|---|
| 10,219,214 B2* | 2/2019 | Huang-Fu | H04L 65/1059 |
| 10,575,207 B2* | 2/2020 | Chong | H04L 65/1016 |
| 10,595,348 B2* | 3/2020 | Kim | H04W 28/0289 |
| 2014/0003337 A1* | 1/2014 | Majmundar | H04W 48/06 370/328 |
| 2015/0256961 A1† | 9/2015 | Kim et al. | |
| 2016/0261754 A1* | 9/2016 | Keller | H04L 63/0227 |
| 2017/0048112 A1* | 2/2017 | Ronneke | H04L 41/12 |
| 2018/0199281 A1* | 7/2018 | Huang-Fu | H04L 65/1086 |
| 2018/0199395 A1* | 7/2018 | Huang-Fu | H04W 88/16 |
| 2018/0359662 A1* | 12/2018 | Kim | H04L 65/1016 |
| 2018/0368050 A1* | 12/2018 | Chun | H04W 36/0022 |
| 2019/0116531 A1* | 4/2019 | Ryu | H04W 4/70 |
| 2019/0141563 A1* | 5/2019 | Ianev | H04W 4/70 |
| 2019/0190775 A1* | 6/2019 | Buckley | H04M 15/73 |
| 2019/0239062 A1* | 8/2019 | Baek | H04W 8/12 |
| 2019/0246436 A1* | 8/2019 | Kim | H04W 60/00 |
| 2019/0289646 A1* | 9/2019 | Kim | H04W 76/18 |
| 2019/0313311 A1* | 10/2019 | Huang-Fu | H04W 24/02 |
| 2019/0350043 A1* | 11/2019 | Huang-Fu | H04W 36/0027 |
| 2019/0357090 A1* | 11/2019 | Drevon | H04W 36/0033 |
| 2020/0037203 A1* | 1/2020 | Ianev | H04W 28/06 |
| 2020/0092747 A1* | 3/2020 | Kumar | H04W 76/18 |
| 2020/0196359 A1* | 6/2020 | Kim | H04W 76/18 |
| 2020/0213854 A1* | 7/2020 | Kim | G06K 9/6282 |

FOREIGN PATENT DOCUMENTS

| | | | | |
|---|---|---|---|---|
| CN | 110115013 A * | 8/2019 | | H04M 15/66 |
| EP | 3035722 | 6/2016 | | |
| EP | 3414956 A1 * | 12/2018 | | G06F 21/44 |
| EP | 3481137 A1 * | 5/2019 | | H04W 60/00 |
| EP | 3539310 A1 * | 9/2019 | | H04W 76/16 |
| EP | 3556076 A1 * | 10/2019 | | H04L 67/14 |
| EP | 3539310 A4 * | 11/2019 | | H04L 65/1059 |
| WO | WO2014042482 † | 3/2014 | | |
| WO | WO2015062643 † | 5/2015 | | |
| WO | WO2015158363 | 10/2015 | | |
| WO | WO-2018006252 A1 * | 1/2018 | | H04W 76/00 |
| WO | WO-2018007214 A1 * | 1/2018 | | H04W 8/04 |
| WO | WO-2018009025 A1 * | 1/2018 | | H04W 76/10 |
| WO | WO-2018127169 A1 * | 7/2018 | | H04W 76/30 |
| WO | WO-2018127170 A1 * | 7/2018 | | H04L 65/1016 |

OTHER PUBLICATIONS

Orange et al., Study on PS Data off function, May 27, 2016, 3GPP, 3GPP SA WG2 Meeting #115, Tdoc: S2-162306 (Year: 2016).*
Orange et al., Study on PS Data off function, May 27, 2016, 3GPP, 3GPP SA WG2 Meeting #115, Tdoc: S2-162916 (Year: 2016).*
Orange et al., Study on PS Data off function, May 27, 2016, 3GPP, 3GPP SA WG2 Meeting #115, Tdoc: S2-163129 (Year: 2016).*
Ericsson, 3GPP PS data off—Solution for Key issues 4 and 5, Jul. 15, 2016, 3GPP, SA WG2 Meeting #116, Tdoc: S2-163291 (Year: 2016).*
Orange, Scope of the study on Data Off, Jul. 15, 2016, 3GPP, SA WG2 Meeting #116, Tdoc: S2-163842 (Year: 2016).*
Ericsson, 3GPP PS data off Key Issues, Jul. 15, 2016, 3GPP, SA WG2 Meeting #116, Tdoc: S2-163843 (Year: 2016).*
Ericsson, 3GPP PS data off—Solution for Key issue 1, Jul. 15, 2016, 3GPP, SA WG2 Meeting #116, Tdoc: S2-163844 (Year: 2016).*
Intel et al., Solution for UE to report 3GPP PS Data Off status to core network, Jul. 15, 2016, 3GPP, SA WG2 Meeting #116, Tdoc: S2-163845 (Year: 2016).*
Ericsson, 3GPP PS data off—Solution for Key issue 3, Jul. 15, 2016, 3GPP, SA WG2 Meeting #116, Tdoc: S2-163846 (Year: 2016).*
Ericsson, 3GPP PS data off—Solution for Key issues 4 and 5, Jul. 15, 2016, 3GPP, SA WG2 Meeting #116, Tdoc: S2-163847 (Year: 2016).*
Ericsson, 3GPP PS data off Key Issues, Jul. 15, 2016, 3GPP, SA WG2 Meeting #116, Tdoc: S2-164125 (Year: 2016).*
Ericsson, 3GPP PS data off—Solution for Key issue 1, Jul. 15, 2016, 3GPP, SA WG2 Meeting #116, Tdoc: S2-164126 (Year: 2016).*
Ericsson, 3GPP PS data off—Solution for Key issue 3, Jul. 15, 2016, 3GPP, SA WG2 Meeting #116, Tdoc: S2-164127 (Year: 2016).*
Ericsson, 3GPP PS data off—Solution for Key issues 4 and 5, Jul. 15, 2016, 3GPP, SA WG2 Meeting #116, Tdoc: S2-164128 (Year: 2016).*
Ericsson, 3GPP PS data off—Solution for Key issue 4 and 6, Jul. 15, 2016, 3GPP, SA WG2 Meeting #116, Tdoc: S2-164129 (Year: 2016).*
BlackBerry UK Ltd, Solution for Key issue 2—Making UE aware of 3GPP PS Data Off exempt services using USSD/USSI, Oct. 21, 2016, 3GPP, SA WG2 Meeting #117, Tdoc: S2-165965 (Year: 2016).*
Nokia et al., New KI#3 solution using PCO for carrying PS Data Off UE status avoiding VPLMN impacts for early deployments, Oct. 21, 2016, 3GPP, SA WG2 Meeting #117, Tdoc: S2-166162 (Year: 2016).*
SA WG2, New SID: Study on PS Data off function, Jun. 17, 2016, 3GPP, 3GPP TSG SA Meeting #72, Tdoc: TD SP-160318 (Year: 2016).*
3GPP, Technical Specification 22.011: Technical Specification Group Services and System Aspects; Service accessibility; Jun. 2016, 3GPP, Version 14.3.0, Release 14 (Year: 2016).*
Ericsson, "3GPP PS data off—Solution for Key issue 4 and 6," S2-163292, SA WG2 Meeting #116, Vienna, Austria, dated Jul. 11-15, 2016, 3 pages, XP051121037.
Extended European Search Report in European Application No. 17824581.7, dated Feb. 20, 2020, 12 pages.
Intel, "New key issues for PS Data Off," S2-163300, SA WG2 Meeting #116, Vienna, Austria, dated Jul. 11-15, 2016, 3 pages, XP051120986.
Orange, "Solution for Key Issues 3 and 5," S2-163621, SA WG2 Meeting #116, Vienna, Austria, dated Jul. 11-15, 2016, 4 pages, XP051121304.
PCT International Search Report and Written Opinion in International Appln. No. PCT/KR2017/007305, dated Oct. 25, 2017, 21 pages (with English translation).†
"3rd Generation Partnership Project; Technical Specification Group Services and System Aspects; Service accessibility (Release 14)," 3GPP TS 22.011 V14.3.0 (Jun. 2016), 30 pages.†
"3rd Generation Partnership Project; Technical Specification Group Services and System Aspects; General Packet Radio Service (GPRS) enhancements for Evolved Universal Terrestrial Radio Access Network (E-UTRAN) access (Release 14)," 3GPP TS 23.401 V14.0.0 (Jun. 2016), 370 pages.†

* cited by examiner
† cited by third party

METHOD FOR TRANSCEIVING SIGNALING RELATED TO PDN CONNECTION IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2017/007305, filed on Jul. 7, 2017, which claims the benefit of U.S. Provisional Application No. 62/379,761, filed on Aug. 26, 2016, and U.S. Provisional Application No. 62/359,685, filed on Jul. 7, 2016. The disclosures of the prior applications are incorporated by reference in their entirety.

TECHNICAL FIELD

The following description relates to a wireless communication system, and more particularly, to a method for transceiving signals related to packet data network (PDN) connection in a data off related status and a device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE

Technical Problem

An object of the present invention is to provide a method how to process PDN connection in data off and data off exempt services.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one embodiment of the present invention, a method for transceiving signals related to packet data network (PDN) connection of a user equipment (UE) in a wireless communication system comprises the steps of checking 3GPP PS Data Off Exempt services; determining whether to generate PDN connection based on a type of PDN connection to be generated by the UE and the checked result of the 3GPP PS Data Off Exempt Services; and transmitting a PDN connection request if the UE determines to generate PDN connection.

In one embodiment of the present invention, a user equipment (UE) for transceiving signals related to PDN connection in a wireless communication system comprises a transceiving module; and a processor, wherein the processor checks 3GPP PS Data Off Exempt services, determines whether to generate PDN connection based on a type of PDN connection to be generated by the UE and the checked result of the 3GPP PS Data Off Exempt Services, and transmits a PDN connection request if the UE determines to generate PDN connection.

The UE may determine not to generate the PDN connection if the PDN connection to be generated by the UE is IMS (Internet protocol Multimedia Subsystem) PDN connection and there is no IMS service in 3GPP PS Data Off Exempt Services.

The UE may maintain an attachment state even though the UE has no PDN connection as the PDN connection is not generated.

The PDN connection to be generated by the UE may previously be configured to be generated during an attachment procedure.

If the UE determines not to generate the PDN connection, the UE may perform at least one of an operation for not providing APN for generating IMS PDN connection to an MME during the attachment procedure, an operation for providing APN for generating PDN connection to the MME during the attachment procedure in addition to APN for generating IMS PDN connection, an operation for not providing APN information to the MME during the attachment procedure, an operation for providing information requesting that PDN connection corresponding to a default APN is not generated to the MME during the attachment procedure, an operation for providing information requesting that PDN connection not the default APN is generated to the MME during the attachment procedure, and an operation for providing information indicating that 3GPP PS Data Off Exempt Services do not exist in services corresponding to the default APN, to the MME during the attachment procedure.

The UE may determine not to generate the PDN connection if the PDN connection to be generated by the UE is non-IMS PDN connection and there is no non-IMS service in 3GPP PS Data Off Exempt Services.

The PDN connection to be generated by the UE may previously be configured to be generated during an attachment procedure.

If the UE determines not to generate the PDN connection, the UE may perform at least one of an operation for not providing APN for generating non-IMS PDN connection to the MME during the attachment procedure, an operation for providing APN for generating PDN connection to the MME during the attachment procedure in addition to APN for generating non-IMS PDN connection, an operation for not providing APN information to the MME during the attachment procedure, an operation for providing information requesting that PDN connection corresponding to a default APN is not generated, to the MME during the attachment procedure, an operation for providing information requesting that PDN connection not the default APN is generated to the MME during the attachment procedure, and an operation for providing information indicating that 3GPP PS Data Off Exempt Services do not exist in services corresponding to the default APN, to the MME during the attachment procedure.

The 3GPP PS Data Off Exempt Services may be checked in a state that PS Data Off is activated.

If PS Data Off of the UE is changed from an activated state to a deactivated state, the UE may start a procedure of generating PDN connection.

The 3GPP PS Data Off Exempt Services may be directed to a PLMN (Public Land Mobile Network) to which the UE is attached.

The 3GPP PS Data Off Exempt Services may be configured in a unit of PLMN.

Advantageous Effects

According to the present invention, PDN connection may efficiently be supported in a data off related status.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
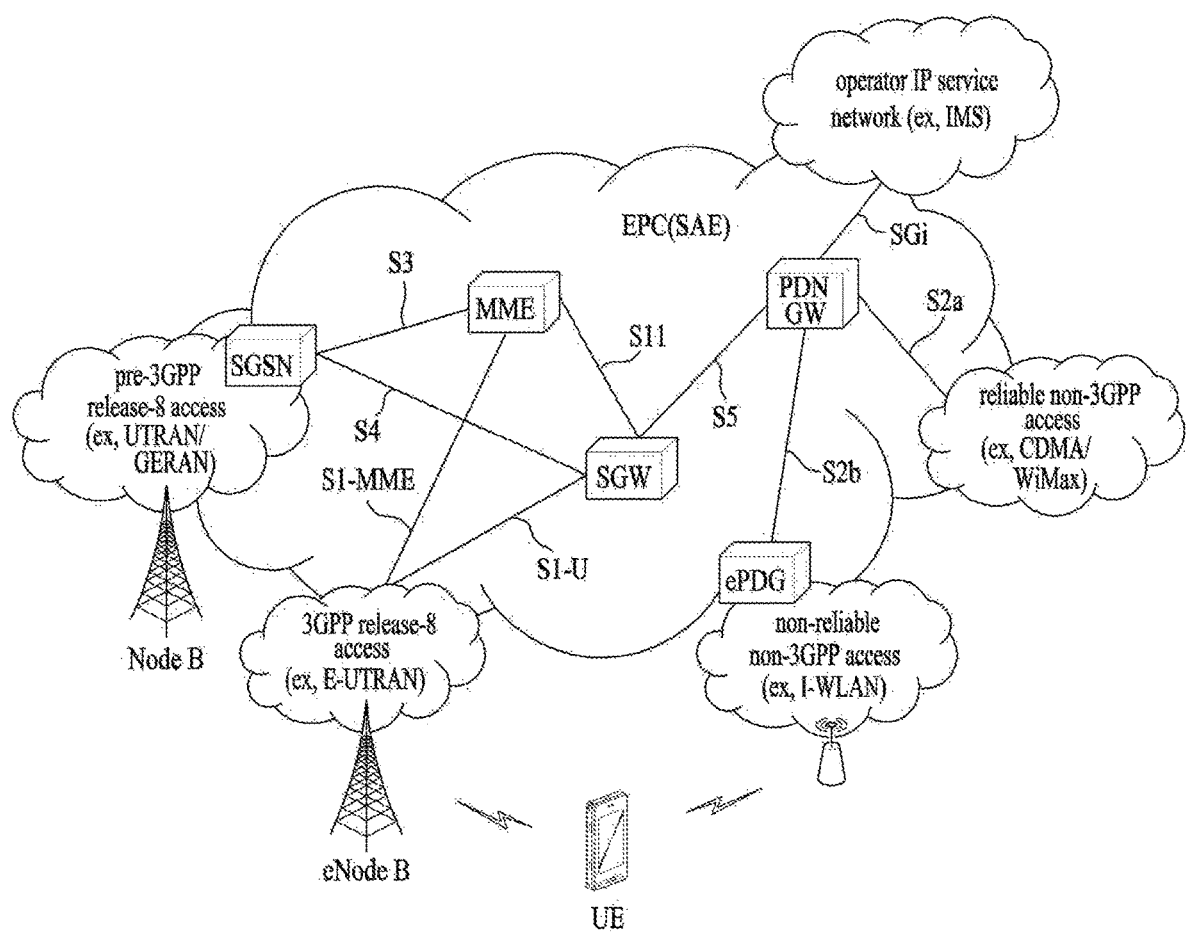
FIG. 1 is a diagram illustrating a brief structure of an evolved packet system (EPS) that includes an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
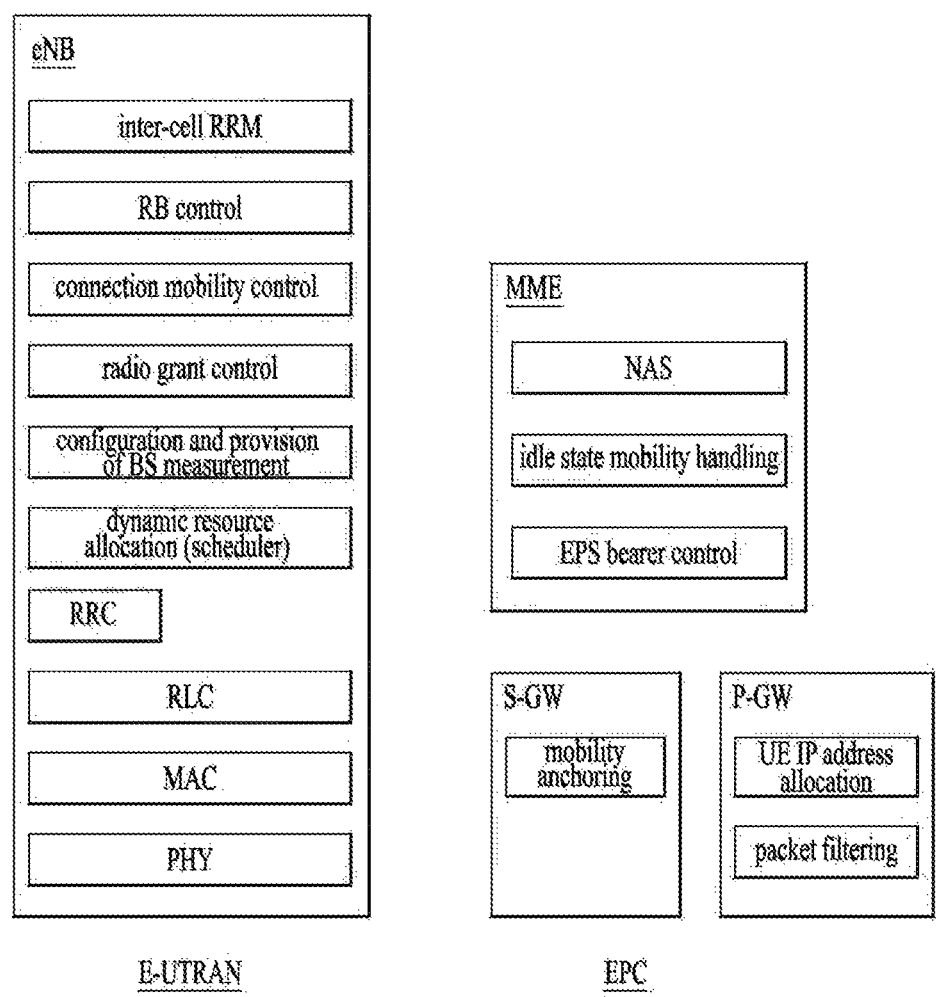
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
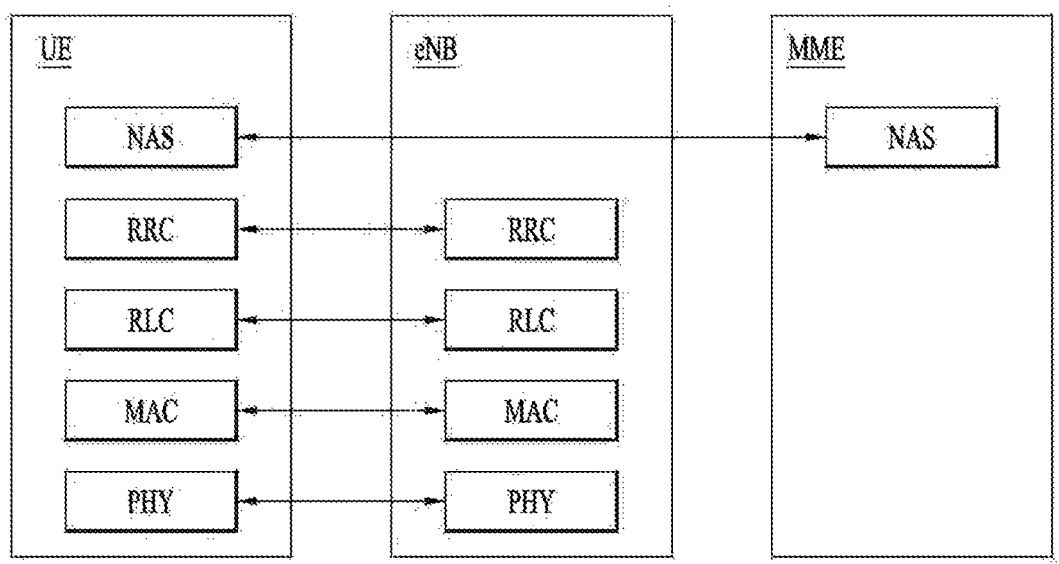
FIG. 3 is an exemplary diagram illustrating a structure of a radio interface protocol on a control plane.
Figure 4:
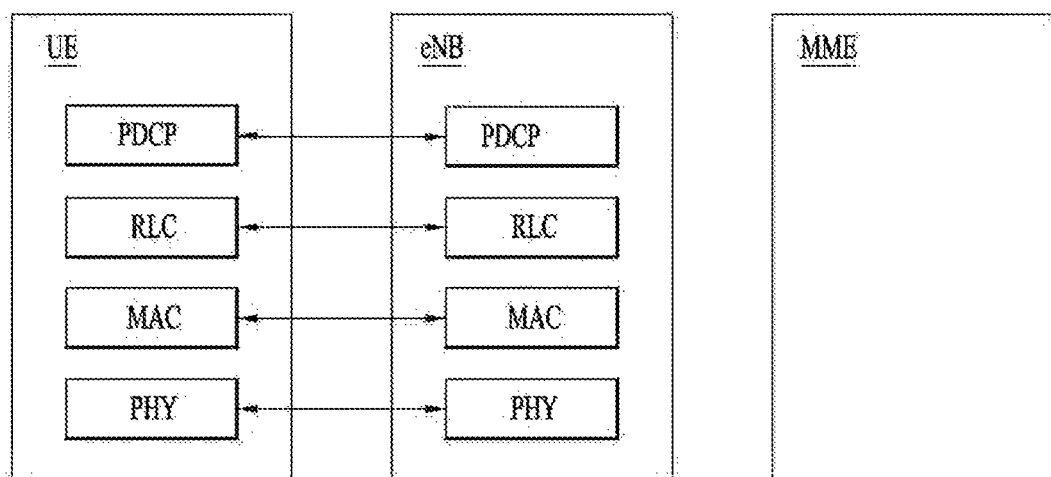
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
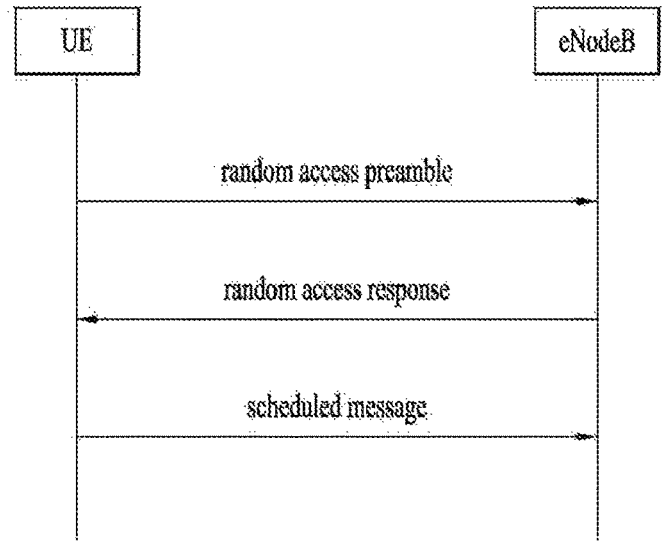
FIG. 5 is a flow chart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
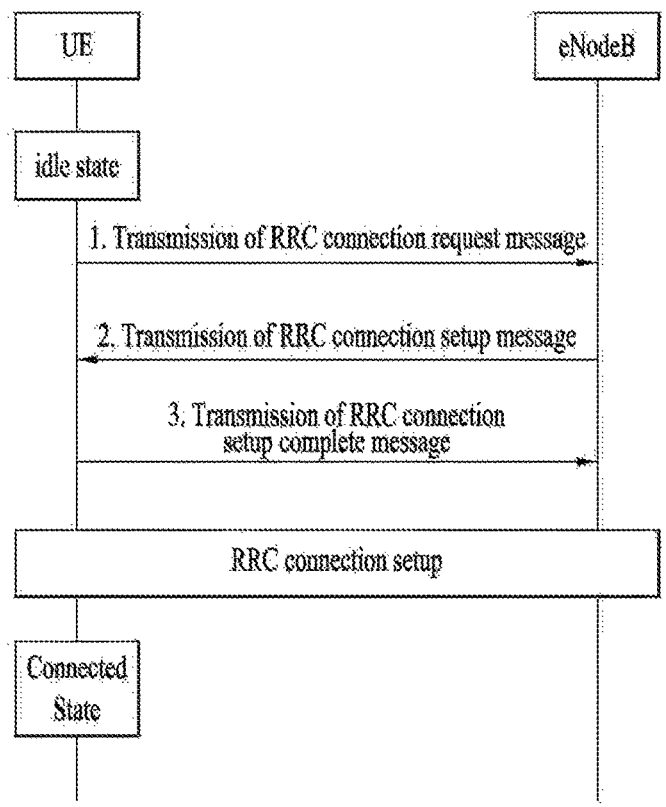
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
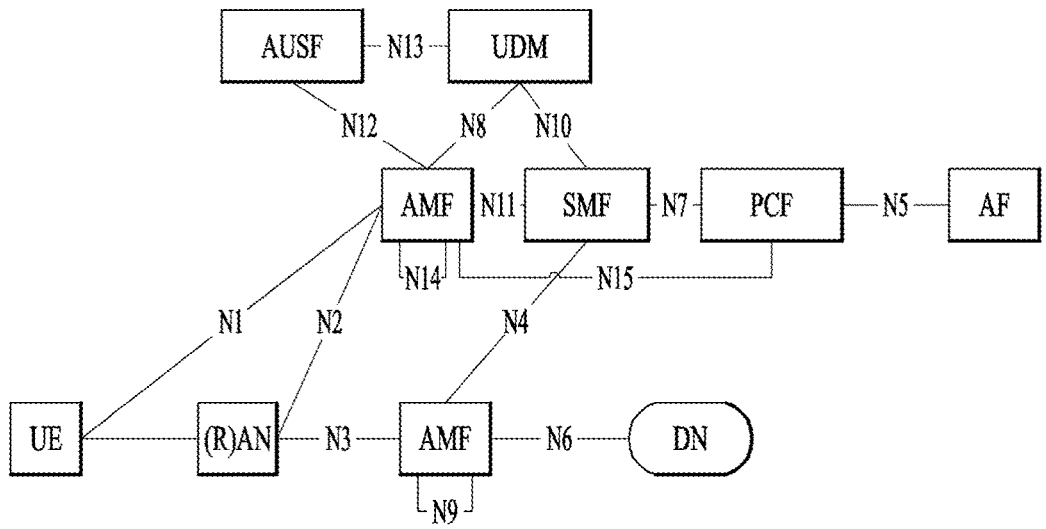
FIG. 7 is a diagram illustrating a 5G system.

In the legacy EPC, MME is categorized into AMF (Core Access and Mobility Management Function) and SMF (session Management Function) in a next generation system (or 5G core network (CN)). Therefore, NAS interaction and MM (Mobility Management) with the UE are performed by the AMF, and SM (Session Management) is performed by the SMF. Also, the SMF manages a UPF (User plane Function) which is a gateway having a user-plane function, that is, for routing user traffic. In this case, a control-plane portion of S-GW and P-GW in the legacy EPC may be managed by the SMF, and a user-plane portion may be managed by the UPF. For routing of user traffic, one or more UPFs may exist between RAN and DN (Data Network). That is, the legacy EPC may be configured in 5G as illustrated in FIG. 7. Also, as a concept corresponding to PDN connection in the legacy EPS, a PDU (Protocol Data Unit) session is defined in the 5G system. The PDU session refers to association between a UE, which provides PDU connectivity services of Ethernet type or unstructured type as well as IP type, and a DN. In addition, a UDM (Unified Data Management) performs a function corresponding to HSS of EPC, and PCF (Policy Control Function) performs a function corresponding to PCRF of the EPC. To satisfy requirements of the 5G system, the functions may be provided in an enlarged type. Details of the 5G system architecture, each function and each interface follows TS 23.501.

Traditionally, voice call is one of the most important functions provided by a UE. In a cellular network, in order to most efficiently provide the voice call, a scheme of consistently allocating a stationary wired/wireless resource during the voice call based on a pattern optimized to voice has been used. That is, when a user is doing voice call, although the user fails to receive voice information during a short time period, the user is able to understand most of contents. However, if voice information is forwarded later than expected, the user may have dissatisfaction against service quality. Therefore, the scheme makes the voice information of the user be immediately transmitted by consistently allocating a resource during the voice call in consideration of the abovementioned property. The scheme is referred to as a circuit-switch scheme, and is used in a traditional wire calling system and a cellular network.

While voice call is performed, a caller does not consistently speak. The caller listens to what a counterpart says when the counterpart says. In this case, if a radio resource is consistently allocated to the caller, it leads to the waste of the radio resource and restricts call volume capable of being supported by a system at the same time. In order to solve the problem, a packet-switch scheme is proposed. All of Internet data are forwarded through the packet-switch scheme. In accordance with the explosive increase and dissemination of the Internet, voice call is also provided via a network using the packet-switch scheme. One example of the voice call is VoLTE. Recently, a service operator providing a voice call service using the packet-switch scheme, i.e., VoLTE, has appeared. Therefore, it is anticipated that a UE supporting the packet-switch scheme only will appear in near future.

Currently, a UE provides such a switch as "mobile data". In most cases, the switch is software configured and is provided by UI (user interface) related to a configuration of the UE. The "mobile data" switch makes a user of the UE determine whether to block an internet connection function. In particular, since there is a restriction on monthly usable data amount depending on calling plan of users, each of the users uses the internet connection function through the switch only when the function is needed to handle internet traffic not to exceed the data amount usable by the user. This internet traffic is a main service using a network of the packet-switch scheme. Since a user may receive Internet service using a wireless LAN instead of blocking mobile data through the "mobile data" switch, the user may block mobile data even in case of a home PLMN as well as a roaming status.

If a user blocks the internet connection function by turning the mobile data switch off, it is the same as that the user blocks a packet switch network. Therefore, voice call provided using the packet switch network is also blocked as well. In case of a network supporting the packet-switch (hereinafter, PS) only or in case of a UE supporting the PS only, since the user is unable to use a voice call service via a circuit switch (hereinafter, CS) network, the user is able to use no voice call at the moment that the user turns the mobile switch off. Since it is necessary for a UE to provide voice call at least, if the mobile data switch blocks all internet traffic, it becomes a problem.

Therefore, although the mobile data switch is turned off, it is preferable to transmit a minimum internet data service or an internet packet for a specific data service to a UE. Also, if the mobile data switch is turned off, it is necessary for a network to efficiently block downlink data transmitted to the UE. That is, it is necessary to have a device capable of passing data related to a minimum service (e.g., voice communication service) and blocking data related other services.

In Section 10 (3GPP PS Data Off) of TS 22.011 related to Data Off, 3GPP PS Data Off is defined as a function of preventing transmission through PDN connection on a 3GPP access network of all IP packets except an IP packet required for 3GPP PS Data Off Exempt Services when the 3GPP PS Data Off is configured by HPLMN and activated by a user. Also, the following requirements are defined. The 3GPP system should provide a mechanism in that an operator can configure an operator service defined as 3GPP PS Data Off Exempt Services for its subscriber. If the 3GPP PS Data Off is activated by the UE, the UE should notify the network that 3GPP PS Data Off has been activated, to maintain billing uniformity, and should stop transmission of uplink IP packets of all services not 3GPP PS Data Off Exempt Services, and the network should stop transmission of downlink IP packets of all services not 3GPP PS Data Off Exempt Services to the UE. 3GPP PS Data Off may be activated in accordance with a roaming status.

The following operator services correspond to some of 3GPP PS Data Off Exempt Services, and may be configured by an HPLMN operator in a unit of PLMN.

MMTel Voice;
SMS over IMS;
USSD over IMS (USSI);
MMTel Video;
Each IMS service is identified by an IMS communication service identifier but is not defined by 3GPP;
Device Management through PS; and
IMS additional service configuration through Ut interface which uses XCAP.

The user should recognize 3GPP PS Data Off Exempt Services.

With respect to the aforementioned Data Off, it is likely that most of services that may become exempt services may be SIP based services (that is, IMS services). In this case, if there is no SIP based service of the exempt services, the UE may perform deregistration for the IMS network and release IMS PDN connection (Contents suggested in 3GPP S2-163291). As described above, 3GPP PS Data Off Exempt Services may be configured by the HPLMN operator in a unit of PLMN. If a serving PLMN of the UE is changed, an inconvenience occurs in that an operation for releasing an IMS PDN or an operation for generating an IMS PDN should be performed in accordance with 3GPP PS Data Off of the UE. Of course, the UE may be subjected to roaming from PLMN #1 which is HPLMN to PLMN #2 which is VPLMN without reattachment, or its roaming network may be changed from PLMN #3 to PLMN #4 without reattachment, wherein both the PLMN #3 and the PLMN #4 are VPLMNs. However, in most cases, since S10 interface between an old MME serving the UE and a new MME does not exist between different PLMNs as the PLMN is changed, the UE performs attachment. Also, in many cases, if the UE performs roaming by moving from one continent to another continent, the UE performs attachment by performing power-on in a power-off state.

Therefore, an efficient PS Data Off related operation that can solve the above problem will be described hereinafter.

Embodiment

Figure 8:
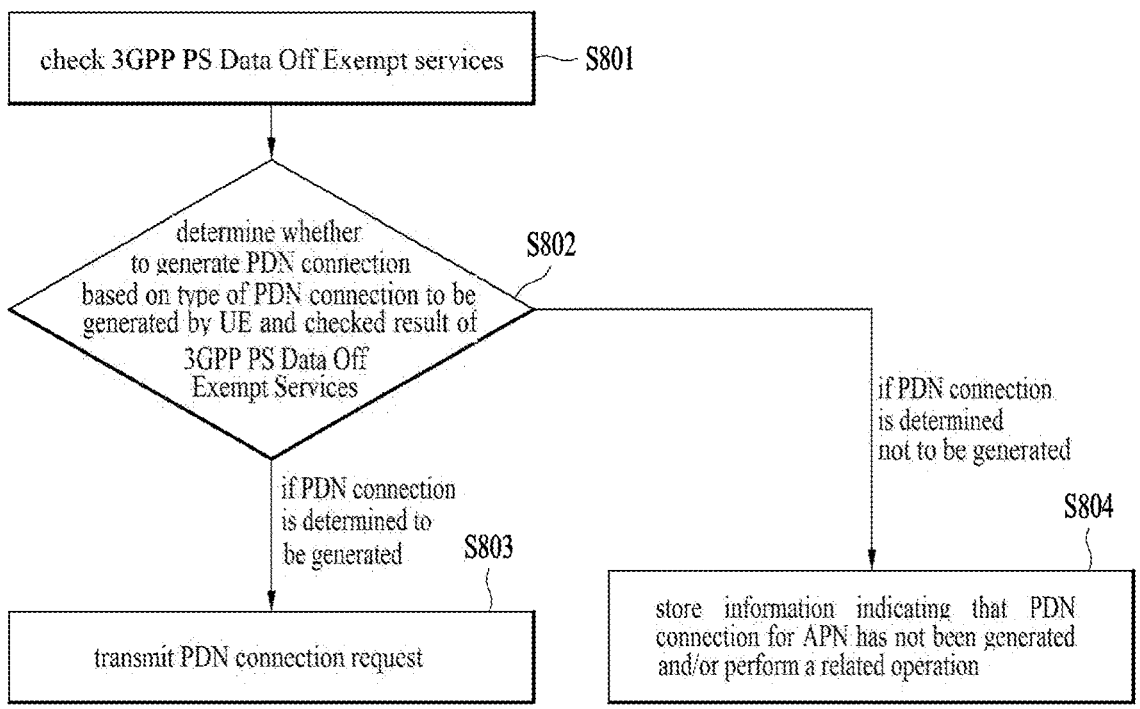
FIG. 8 is a diagram illustrating the embodiment of the present invention.

The UE according to one embodiment of the present invention checks 3GPP PS Data Off Exempt Services (S801 of FIG. 8), and determines whether to generate PDN connection based on a type of PDN connection to be generated by the UE and the checked result of the 3GPP PS Data Off Exempt Services (S802). If the UE determines to generate PDN connection, the UE may transmit a PDN connection request (S803).

If PDN connection to be generated by the UE is IMS PDN connection and there is no IMS service in 3GPP PS Data Off Exempt Services, the UE may determine so as not to generate the IMS PDN connection. Alternatively, if PDN connection to be generated by the UE is non-IMS PDN connection and there is no non-IMS service in 3GPP PS Data Off Exempt Services, the UE may determine so as not to generate the non-IMS PDN connection. In this way, if the UE determines not to generate the PDN connection, PS Data Off is activated, whereby the UE may store information indicating that PDN connection for a corresponding APN has not been generated and/or perform a related operation which will be described later (S804).

The UE may maintain the attachment state even though the UE has no PDN connection as PDN connection is not generated. In more detail, if the UE has not generated PDN connection as PS Data Off is activated, the MME may know the reason why that the PDN connection has not been generated, based on various kinds of information acquired from the UE. Therefore, the MME may determine not to detach the UE even though the UE has no PDN connection. That is, the MME may determine to maintain the UE at the attachment state. The UE may also determine to maintain the attachment state even though it has not generated any PDN connection. In this case, when PS Data Off has been deactivated, the UE may be prevented from first performing attachment, whereby the UE may quickly generate PDN connection to receive services.

PDN connection to be generated by the UE may previously be configured to be generated during an attachment procedure, or may be PDN connection (for example, PDN connection to be additionally generated after attachment in addition to PDN connection generated during the attachment procedure) to be generated after attachment.

Subsequently, if the UE determines not to generate the aforementioned IMS PDN connection, the UE may perform at least one of i) an operation for not providing APN for generating IMS PDN connection to the MME during the attachment procedure, ii) an operation for providing APN for generating PDN connection to the MME during the attachment procedure in addition to APN for generating IMS PDN connection (for example, APN (APN for generating Internet PDN connection) for generating non-IMS PDN connection may be provided.), iii) an operation for not providing APN information to the MME during the attachment procedure, iv) an operation for providing information requesting that PDN connection corresponding to a default APN is not generated to the MME during the attachment procedure, v) an operation for providing information requesting that PDN connection not the default APN is generated to the MME during the attachment procedure, and vi) an operation for providing information indicating that 3GPP PS Data Off Exempt Services do not exist in services corresponding to the default APN, to the MME during the attachment procedure.

Alternatively, if the UE determines not to generate the aforementioned non-IMS PDN connection, the UE may perform at least one of i) an operation for not providing APN for generating non-IMS PDN connection to the MME during the attachment procedure, ii) an operation for providing APN (for example, APN for generating IMS PDN connection) for generating PDN connection to the MME during the attachment procedure in addition to APN for generating non-IMS PDN connection, iii) an operation for not providing APN information to the MME during the attachment procedure, iv) an operation for providing information requesting that PDN connection corresponding to a default APN is not generated, to the MME during the attachment procedure, v) an operation for providing information requesting that PDN connection not the default APN is generated to the MME during the attachment procedure, and vi) an operation for providing information indicating that 3GPP PS Data Off Exempt Services do not exist in services corresponding to the default APN, to the MME during the attachment procedure.

In the aforementioned description, 3GPP PS Data Off Exempt Services may be checked in a state that PS Data Off is activated. This means that information indicating that PS Data Off is activated is notified to the MME during attachment (procedure). The timing when PS Data Off is activated in the UE may be the time when attachment of the UE is performed, or may be the time after attachment (e.g., in case of PDN connection to be additionally generated after attachment). If the UE has already checked whether PS Data Off has been activated during attachment, the UE may not check whether PS Data Off has been activated.

If PS Data Off of the UE is changed from an activated state to a deactivated state, the UE may start a procedure of generating PDN connection. For example, the MME may transmit, to the UE, a NAS message requesting the UE to generate PDN connection for the corresponding APN. Therefore, the UE may generate PDN connection through a UE requested PDN connectivity procedure in section 5.10.2 of TS 23.401. However, without limitation to this case, various methods may be used. For example, the procedure in section 5.10.2 of TS 23.401 may be used as it is, or at least a part of the procedure may be used in a modified form.

Meanwhile, 3GPP PS Data Off Exempt Services may be directed to PLMN (Public Land Mobile Network) to which the UE is attached. Also, 3GPP PS Data Off Exempt Services may be configured by an HPLMN operator in a unit of PLMN.

Meanwhile, if the UE determines not to generate the aforementioned IMS PDN connection, the MME may perform at least one of i) an operation for determining not to generate IMS PDN connection for the UE during the attachment procedure, ii) an operation for determining not to generate PDN connection corresponding to a default APN for the UE during the attachment procedure, iii) an operation for determining to generate and/or performing PDN connection corresponding to APN provided by the UE for the UE during the attachment procedure, iv) an operation for determining to generate and/or performing PDN connection corresponding to another APN not the default APN for the UE during the attachment procedure (information on another APN may be based on subscriber information, and for example, may be Internet PDN connection), and v) an operation for storing information indicating that PDN connection for the corresponding APN has not been generated as PS Data Off of the UE is activated if the MME determines not to generate PDN connection as above.

Also, if the UE determines not to generate the aforementioned non-IMS PDN connection, the MME may perform at least one of i) an operation for determining not to generate non-IMS PDN connection for the UE during the attachment procedure, ii) an operation for determining not to generate PDN connection corresponding to a default APN for the UE during the attachment procedure, iii) an operation for determining to generate and/or performing PDN connection corresponding to APN provided by the UE for the UE during the attachment procedure, and iv) an operation for determining to generate and/or performing PDN connection corresponding to another APN not the default APN for the UE during the attachment procedure (information on another APN may be based on subscriber information, and for example, may be IMS PDN connection).

In the above description, IMS PDN connection may be construed as PDN connection for IMS service or PDN connection for SIP based service. Also, non-IMS PDN connection may be construed as PDN connection for another service not IMS service or PDN connection for non-SIP based services. An example of the non-SIP based services may include Internet service.

Meanwhile, in the aforementioned description, each network node/function, procedure, etc. have been described based on EPS but may be replaced with network node/function, procedure, etc., which correspond to the network node/function in the legacy EPS, in the 5G system. For example, the attachment procedure may be replaced with (initial) registration procedure, the detachment procedure may be replaced with a deregistration procedure, the MME may be replaced with an AMF (Access and Mobility Management Function), the APN may be replaced with a DNN (Data Network Name), and the PDN connection may be replaced with a PDU session. Unlike the EPS, a PDU session may not be generated in the 5G system during the attachment (procedure) (that is, initial registration). That is, the attachment procedure may be performed for attachment only, and then the PDU session may start to be generated. In this case, it is to be understood that the aforementioned description is applied to all PDU sessions to be generated by the UE.

Figure 9:
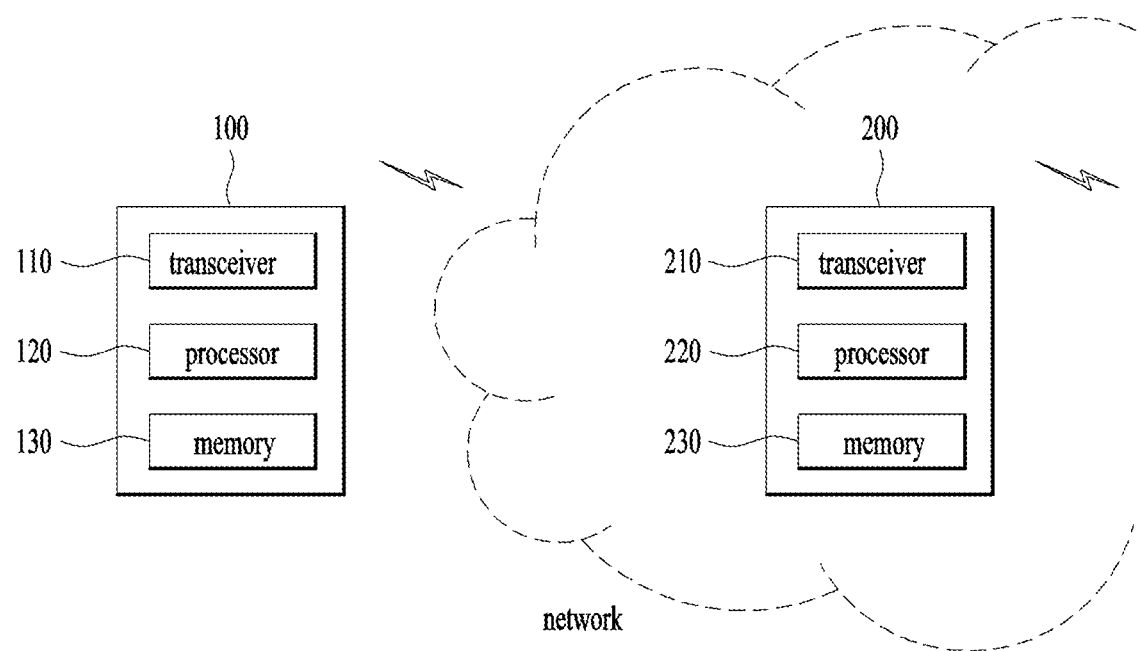
FIG. 9 is a diagram a configuration of a network node device according to the embodiment of the present invention.

FIG. 9 is a diagram illustrating a configuration of a UE and a network node device according to one embodiment of the present invention.

Referring to FIG. 9, a UE 100 according to the present invention may include a transceiving module 110, a processor 120 and a memory 130. The transceiving module 110 may be configured to transmit various signals, data and information to an external device and receive various signals, data and information from the external device. The UE 100 may be connected with the external device through the wire and/or wireless. The processor 120 may control the overall operation of the UE 100, and may be configured to perform a function of operation-processing information to be transmitted to and received from the external device. The memory 130 may store the operation-processed information for a predetermined time, and may be replaced with a buffer (not shown). Also, the processor 120 may be configured to perform a UE operation suggested in the present invention.

Referring to FIG. 9, the network node device 200 according to the present invention may include a transceiving module 210, a processor 220, and a memory 230. The transceiving module 210 may be configured to transmit various signals, data and information to an external device and to receive various signals, data and information from the external device. The network node apparatus 200 may be connected with the external device through the wire and/or wireless. The processor 220 may control the overall operation of the network node apparatus 200, and may be configured to allow the network node apparatus 200 to perform a function of operation-processing information to be transmitted to and received from the external device. The memory 230 may store the operation-processed information for a predetermined time, and may be replaced with a buffer (not shown). Also, the processor 220 may be configured to perform a network node operation suggested in the present invention. In detail, the processor 220 may check 3GPP PS Data Off Exempt Services, determine whether to generate PDN connection based on a type of PDN connection to be generated by the UE and the checked result of the 3GPP PS Data Off Exempt Services, and may transmit a PDN connection request if the UE determines to generate PDN connection.

Also, the details of the aforementioned UE 100 and the aforementioned network node device 200 may be configured in such a manner that the aforementioned various embodiments of the present invention may independently be applied to the aforementioned UE 100 and the aforementioned network node apparatus 200, or two or more embodiments may simultaneously be applied to the aforementioned UE 100 and the aforementioned network node apparatus 200, and repeated description will be omitted for clarification.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, and the like.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit and scope of the invention disclosed in the appended claims. Thus, the present invention is not intended to be limited to the embodiments described herein, but is intended to accord with the widest scope corresponding to the principles and novel features disclosed herein.

INDUSTRIAL APPLICABILITY

Although embodiments of the present invention have been described above focusing on the 3GPP system, they are applicable to various mobile communication systems in the same manner.

The invention claimed is:
1. A method performed by a user equipment (UE) in a wireless communication system, the method comprising:
identifying packet-switched (PS) data off exempt services and a packet data network (PDN) connection configured to be generated by the UE;
performing an attachment procedure with generating the PDN connection, based on a type of the PDN connection not being included in the PS data off exempt services; and
performing the attachment procedure without generating the PDN connection, based on the type of the PDN connection being included in the PS data off exempt services,
wherein the performing the attachment procedure without generating the PDN connection comprises providing a core network with information that causes the core network to maintain the UE at an attachment state while the UE has no PDN connection.

2. The method of claim 1, further comprising:
determining not to generate the PDN connection, based on the PDN connection being Internet protocol multimedia subsystem (IMS) PDN connection and an IMS service not being included in the PS data off exempt services.

3. The method of claim 2, wherein the attachment state of the UE is maintained even though the UE has no PDN connection as the PDN connection is not generated.

4. The method of claim 2, wherein the PDN connection is previously configured to be generated during the attachment procedure.

5. The method of claim 2, wherein the performing the attachment procedure without generating the PDN connection comprises, performing at least one of:
an operation for not providing access point name (APN) for generating IMS PDN connection to a core network entity during the attachment procedure,
an operation for providing APN for generating PDN connection to the core network entity during the attachment procedure in addition to APN for generating IMS PDN connection,
an operation for not providing APN information to the core network entity during the attachment procedure,
an operation for providing information requesting that PDN connection corresponding to a default APN is not generated to the core network entity during the attachment procedure,
an operation for providing information requesting that PDN connection not the default APN is generated to the core network entity during the attachment procedure, or
an operation for providing information indicating that PS data off exempt services do not exist in services corresponding to the default APN, to the core network entity during the attachment procedure.

6. The method of claim 1, further comprising:
determining not to generate the PDN connection, based on the PDN connection being non-IMS PDN connection and a non-IMS service not being included in the PS data off exempt services.

7. The method of claim 6, wherein the PDN connection to be generated by the UE is previously configured to be generated during the attachment procedure.

8. The method of claim 6, wherein the performing the attachment procedure without generating the PDN connection comprises, performing at least one of:
an operation for not providing APN for generating non-IMS PDN connection to a core network entity during the attachment procedure,
an operation for providing APN for generating PDN connection to the core network entity during the attachment procedure in addition to APN for generating non-IMS PDN connection,
an operation for not providing APN information to the core network entity during the attachment procedure, an operation for providing information requesting that PDN connection corresponding to a default APN is not generated, to the core network entity during the attachment procedure, an operation for providing information requesting that PDN connection not the default APN is generated to the core network entity during the attachment procedure, or an operation for providing information indicating that PS data off exempt services do not exist in services corresponding to the default APN, to the core network entity during the attachment procedure.

9. The method of claim 1, wherein the PS data off exempt services are identified in a state that PS data off is activated.

10. The method of claim 1, further comprising:
based on the PS data off of the UE being changed from an activated state to a deactivated state, starting a procedure of generating the PDN connection.

11. The method of claim 1, wherein the PS data off exempt services are related to a public land mobile network (PLMN) to which the UE is attached.

12. The method of claim 11, wherein the PS data off exempt services are configured per PLMN.

13. A user equipment (UE) configured to operate in a wireless communication system, the UE comprising:
a transceiver; and
a processor coupled to the transceiver and configured to:
identify packet-switched (PS) data off exempt services and a packet data network (PDN) connection configured to be generated by the UE,
perform an attachment procedure with generating the PDN connection, based on a type of the PDN connection not being included in the PS data off exempt services, and
perform the attachment procedure without generating the PDN connection, based on the type of the PDN connection being included in the PS data off exempt services,
wherein the processor is further configured to, in case of performing of the attachment procedure without generating the PDN connection, provide a core network with information that causes the core network to maintain the UE at an attachment state while the UE has no PDN connection.

14. The UE of claim 13, wherein the processor is further configured to determine not to generate the PDN connection based on the PDN connection being Internet protocol multimedia subsystem (IMS) PDN connection and an IMS service not being included in the PS data off exempt services.

15. The UE of claim 13, wherein the attachment state of the UE is maintained even though the UE has no PDN connection as the PDN connection is not generated.

16. The method of claim 1, wherein the providing the core network with the information comprises, performing at least one of:
an operation for not providing access point name (APN) for generating the PDN connection to a core network entity during the attachment procedure,
an operation for providing another APN, different from APN for generating the PDN connection, for generating another PDN connection to the core network entity during the attachment procedure,
an operation for not providing APN information to the core network entity during the attachment procedure,
an operation for providing information requesting that the PDN connection related to a default APN is not generated to the core network entity during the attachment procedure,
an operation for providing information requesting that another PDN connection not related to the default APN is generated to the core network entity during the attachment procedure, or
an operation for providing information indicating that the PS data off exempt services do not include services related to the default APN, to the core network entity during the attachment procedure.

17. The UE of claim 13, wherein the processor is further configured to provide the core network with the information by performing at least one of:
an operation for not providing access point name (APN) for generating the PDN connection to a core network entity during the attachment procedure,
an operation for providing another APN, different from APN for generating the PDN connection, for generating another PDN connection to the core network entity during the attachment procedure,
an operation for not providing APN information to the core network entity during the attachment procedure,
an operation for providing information requesting that the PDN connection related to a default APN is not generated to the core network entity during the attachment procedure,
an operation for providing information requesting that another PDN connection not related to the default APN is generated to the core network entity during the attachment procedure, or
an operation for providing information indicating that the PS data off exempt services do not include services related to the default APN, to the core network entity during the attachment procedure.

* * * * *